United States Patent [19]
Randall

[11] 3,971,867
[45] July 27, 1976

[54] DECORATIVE ACOUSTICAL BUILDING PANEL

[76] Inventor: Robert L. Randall, 7800 SW. 89th, Portland, Oreg. 97223

[22] Filed: July 29, 1974

[21] Appl. No.: 492,703

[52] U.S. Cl. .................................. 428/45; 428/88; 428/83; 52/145; 52/475; 52/627; 52/656; 181/33 G
[51] Int. Cl.² ...................... B32B 1/04; E04B 1/82; E04C 2/38; G10K 11/04
[58] Field of Search .............................. 161/43–44; 52/144–145, 475, 511, 627, 656; 428/81–83, 45, 85, 88; 181/33 G, 33 R

[56] References Cited
UNITED STATES PATENTS

| | | | |
|---|---|---|---|
| 1,911,605 | 5/1933 | Corlette | 428/45 X |
| 2,139,880 | 12/1938 | Colucci | 428/81 X |
| 3,021,915 | 2/1962 | Kemp | 181/33 G |
| 3,095,943 | 7/1963 | Kemp | 181/33 G |
| 3,204,380 | 9/1965 | Smith et al. | 52/144 X |
| 3,351,154 | 11/1967 | Kodaras | 52/145 X |
| 3,706,171 | 12/1972 | Shayman | 52/475 |
| 3,748,799 | 7/1973 | Tough et al. | 52/627 X |
| 3,765,141 | 10/1973 | Shayman | 52/144 X |

*Primary Examiner*—Philip Dier
*Attorney, Agent, or Firm*—Chernoff & Vilhauer

[57] ABSTRACT

A decorative sound-absorbing modular building panel comprised of a core sheet of plywood or other lignocellulosic board material having a layer of textile carpeting material adhesively affixed to the respective major surfaces thereof and a peripheral frame formed of U-shaped metal channel members covering the exposed edges of the textile-overlaid core sheet and adhesively secured thereto. The panel is fabricated in a batch stacking process which eliminates the need for special jigs and presses and ensures that the resulting panel is flat and warp-free with the textile layers securely bonded thereto.

6 Claims, 4 Drawing Figures

DECORATIVE ACOUSTICAL BUILDING PANEL

BACKGROUND OF THE INVENTION

The present invention relates to a novel modular building panel of decorative design having advantageous structural and sound-absorbing properties.

In offices, schools, libraries, museums and the like, the present exorbitant and ever increasing cost of conventional building techniques mandates the use of readily-erectable, movable and easily-cleaned modular building panels of inexpensive and sturdy manufacture as a substitute for conventional walls of permanent, framed-in construction.

BRIEF SUMMARY OF INVENTION

The novel building panel of the present invention comprises a core sheet of plywood or other ligno-cellulosic board material to whose respective major surfaces is adhesively secured a substantially congruent layer of textile carpeting material. A peripheral frame formed of mitered U-shaped metal channel members, secured only by adhesive to the textile-overlaid core, completes the panel construction.

The building panel of the present invention may be employed in many ways, as office and room dividers, walls for office cubicles, bulletin boards and the like. It may be affixed to stationary mountings in a room or office or attached to rollers or casters for portability. The size of the building panels can be standardized so that they can be readily adapted for modular construction of cubicles and the like. In addition to its excellent sound-dampening properties which makes it especially useful for shielding sounds from neighboring offices or rooms, the panel provides an ideal nailing and fastener gripping surface for the mounting of bookcases, shelves and other wall-hung units. Also, papers and other articles can be readily tacked onto the panel surfaces. Further, the textile carpeting material which covers the exposed surfaces of the panel, as enframed by the metal channel members, presents a highly decorative appearance to the viewer. By utilizing washable indoor-outdoor carpeting as the textile material for the building panel dirt and soil spots can be readily removed with a damp cloth, used either alone or with a carpet cleaning agent or by vacuuming or other conventional cleaning methods.

The panel fabrication process comprises a sequence of steps involving the affixing with adhesive of a textile layer to one side of the core panel sheet, forming a stack of such partially-finished panels, and then allowing the adhesive to cure as the weight of the stack holds the panels flat and rigid and presses the respective textile layers thereto. The panels are next removed individually from the stack, flipped over and a layer of textile material similarly applied with adhesive to the other, previously uncovered side of each of the panels, the panels then being formed into a new stack of fully covered panels in reverse order from that of the first stack. The adhesive securing the second layers to the panel surface is then allowed to cure as the panels lie under the weight of the new stack. The curing of the adhesive while the panels are in stacked formation ensures that the textile-overlaid panels produced are flat and wrinkle free, as the sequence of steps, including the reversing of the order of the panels in the second stack, and the pressing weight of the stacked panels, ensures the desired results without the need for special jigs or presses.

It is therefore the principal objective of the present invention to provide a decorative acoustical panel of novel design which is of inexpensive and sturdy construction for use as a wall surface or room divider to which cabinets, shelving and the like can be readily secured.

It is another principal objective of the present invention to provide a method for manufacturing a building panel of the type described which minimizes the amount of tooling required for fabrication and eliminates the need for jigs and presses to obtain quantity production of warp-free panels.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
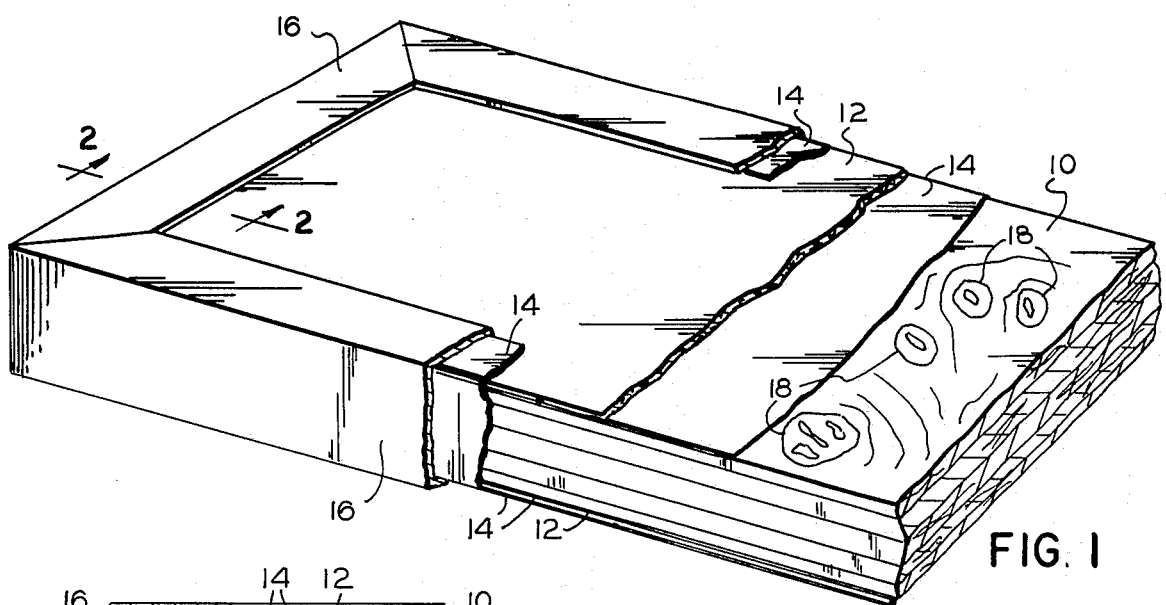
FIG. 1 is a perspective view of an embodiment of the building panel of the present invention, partially broken away to illustrate details of its interior construction.
Figure 2:
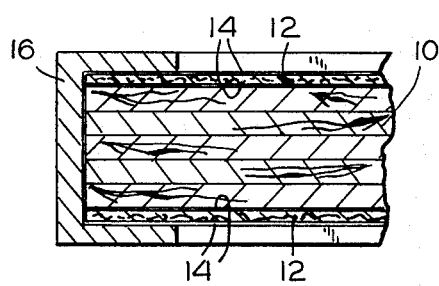
FIG. 2 is a vertical sectional view of the panel stack taken along line 2—2 of FIG. 1.

As shown in FIGS. 1 and 2, the building panel embodiment of the present invention is shown comprising a core sheet 10 of plywood, solid wood, hardboard, chipboard, particleboard or similar ligno-cellulosic board material having textile material 12 respectively overlaid on the two major surfaces thereof and secured thereto by adhesive 14. (Knotholes, voids and similar defects in the core sheet 10, if made of plywood, are first filled, as shown, with a suitable sizing such as a spackling compound 18.) Covering the exposed edges of the textile-overlaid core sheet is a peripheral frame 16 formed of U-shaped metal channel members and similarly secured thereto by a layer of adhesive 14.

The core sheet member 10 can be made up, as previously indicated, of any suitable ligno-cellulosic panel material, although plywood is preferred because of its low cost and sturdy construction. The core sheet member should be at least one-half of an inch in thickness to provide both sufficient noise-insulating properties and structural strength to the finished panel as well as a suitable gripping element for nails and the like, with the preferred thickness for the core sheet being three-quarters of an inch to one inch.

The "textile" layers affixed to the major surfaces of the core sheet should each be at least one-tenth of an inch in thickness in order to efficiently absorb sound and to be of sufficient durability to provide long wear. The preferred "textile material" (referring herein to both woven and non-woven fabric materials) is a type of carpeting known generally in the trade as indoor-outdoor carpeting, suitable examples of which are manufactured by Ozark Industries, Inc., of Miami, Okla., under the tradename EVERFAST, or by Ozite Corporation, of Libertyville, Ill., under the tradename DURAVIL. Indoor-outdoor carpeting is especially suitable for this application because, in addition to its sound absorbing and durable properties, it is decorative, fully washable, relatively inexpensive and requires minimal maintenance after installation.

The peripheral frame 16 of U-shaped channel members which serves to rigidize the building panel and prevent warping of the wooden core sheet can be constructed of aluminum or plastic extrusions which have been surface anodized with metallic or other decorative color treatment. Other suitable lightweight and rugged materials can also be utilized for the framing members. As indicated in FIG. 2, the interior dimension of the U-shaped channel frame is sized to snuggly fit over the textile overlaid edges of the core sheet 10. The ends of each channel element forming the frame are mitered so that they will fit together evenly at the corners of the panel.

The adhesive 14 utilized to secure respectively the textile layers 12 and the framing channel members 16 to the core sheet can be any suitable conventional contact cement generally available from carpeting and hardware distributors, such as the waterproof latex-type carpeting adhesive marketed by Weldwood Packaged Products, of Kalamazoo, Mich., under the tradename WELDWOOD.

Figure 3:
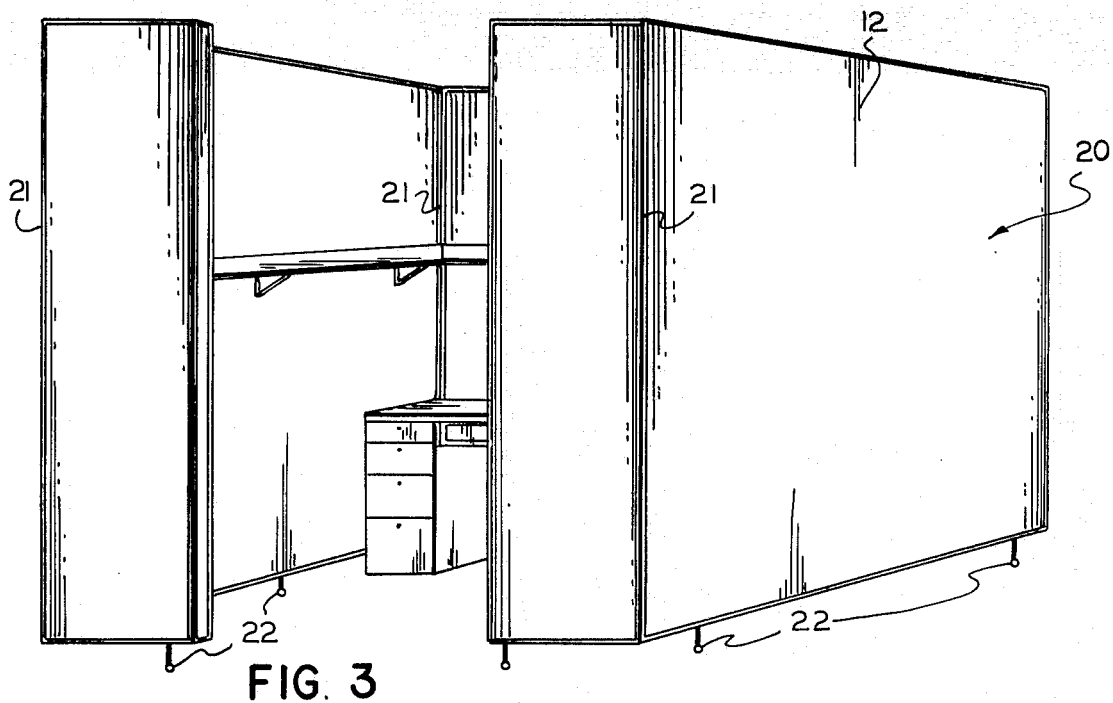
FIG. 3 is a pictorial view of a plurality of building panels combined together to form a modular office cubicle.

FIG. 3 shows a plurality of building panels fabricated in accordance with the present invention combined together to form a modular office cubicle 20. Such cubicles can be readily set up on site and later dismantled and transferred for re-erection at a new location, as required. Support legs 22 are attached to the bottom edge of the respective panels 10 to elevate them above ground and to facilitate erection and cleaning of the cubicle. Individual panels are joined together along their common edges 21 by conventional fasteners to form the semi-enclosed cubicle. By reason of the decorative appearance provided by the textile overlay on both sides of the panels, no additional finishing or surface treatment is required and a cubicle, once erected, is ready for immediate use. The secure nailing and gripping surface provided by the thickness of the core sheet provides a handy means for mounting of shelving, cabinets, and other wall-hung articles directly to the panel.

Figure 4:
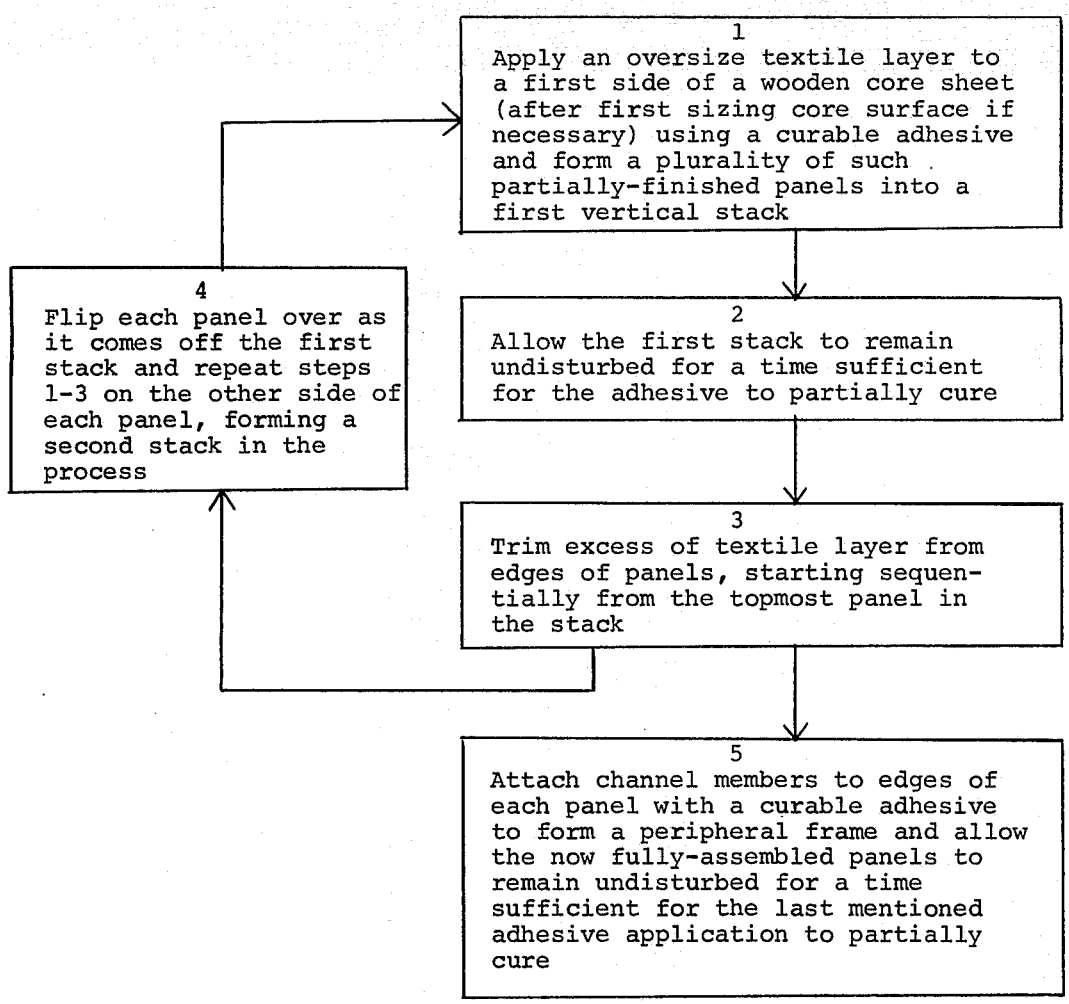
FIG. 4 is a flow diagram illustrating the sequence of steps in the manufacture of the building panels.

FIG. 4 is a flow sheet showing the steps in the manufacturing process for fabricating the panel of the present invention without the need for special tools, jigs or presses. The materials used to fabricate the panels are inexpensive and the panels themselves can be fabricated with unskilled labor in a minimum amount of time using a small amount of floor space. In a batch operation a number of wooden core sheets, typically five to thirty, are selected and stacked one upon another in a first pile. The topmost sheet in the stack, if of plywood, has its exposed surface smoothed down by sanding and the knotholes and other surface defects therein filled with spackling compound. After this smoothing operation, a layer of adhesive is applied over the surface of the top sheet and a precut layer of textile material applied to the exposed side. The size of the textile layer is slightly larger than the core sheet, the excess being removed in a subsequent trimming operation to be described hereinafter.

The topmost panel in the stack is then removed and placed at the bottom of a new stack and the foregoing procedure is repeated for the remaining panels in the first stack until a complete second stack is formed. The pressing effect created by the new stack serves to smooth out wrinkles in the textile layers newly glued to the respective panel surfaces and also prevents any warpage occurring in the wooden core sheets. After a sufficient amount of time has elapsed for the adhesive to partially cure (24–48 hours for the exemplary contact cement indicated), the overhanging edges of the textile layer are trimmed to about even with the edges of the core sheet in each of the panels. The partially-finished panels in the second stack are then flipped over and the foregoing steps, starting with the topmost panel, repeated so as to apply the second layer of textile material to the other side of the respective panels and a third stack formed. Again, after a sufficient amount of time has elapsed for the adhesive securing the respective second textile layers to partially cure, the overhanging excess of the second layer of textile material is trimmed off as before. The U-shaped channel members, corresponding in length to the edges of the textile-overlaid core sheets, are then installed with adhesive to form the peripheral frame around the edges of the panel. If desired spacer blocks may be used to temporarily raise the panel being worked upon above the stack while the frame members are installed. After the frames are affixed the panels may be arranged either vertically in stacks (which is preferred) or horizontally on edge while the adhesive securing the frame members to the edges of the panel is then similarly allowed to cure for typically 24–48 hours. After this last curing step the batch of panels are then finished and ready for use.

The terms and expressions which have been employed in the foregoing abstract and specification are used therein as terms of description and not of limitation, and there is no intention in the use of such terms and expressions of excluding equivalents of the features as shown and described, or portions thereof, it being recognized that the scope of the invention is defined and limited only by the claims which follow.

What is claimed is:

1. A decorative acoustical building panel comprising:
   a. a core member of ligno-cellulosic board material;
   b. a layer of sound-absorbent textile material overlaying substantially the two major surfaces of said core member and adhesively affixed thereto; and
   c. a peripheral frame formed of U-shaped channel members extending substantially completely around the perimeter of said textile-overlaid core member, covering the exposed edges thereof and secured thereto substantially only by adhesive bonding.

2. The building panel of claim 1 wherein said sound-absorbent textile material is non-woven carpet material.

3. The building panel of claim 1 wherein the core member is plywood.

4. The building panel of claim 1 wherein the adhesive employed is a latex-base contact adhesive.

5. The building panel of claim 1 wherein said core member has a thickness of at least one-half inch and said textile layer has a thickness of at least one-tenth inch.

6. The building panel of claim 1 wherein said peripheral frame is adhesively bonded to said textile-overlaid core member along the three inside surfaces of said U-shaped channel members, thereby providing an adhesive bond between said channel members and said core member and between said channel members and each of said textile layers.

* * * * *